(12) United States Patent
Fahmy

(10) Patent No.: US 6,171,680 B1
(45) Date of Patent: Jan. 9, 2001

(54) COMPOSITE SHEATHING MATERIAL HAVING HIGH WATER VAPOR PERMEABILITY

(75) Inventor: Mohamed A. Fahmy, Kalamazoo, MI (US)

(73) Assignee: K2, Inc., Adrian, MI (US)

( * ) Notice: Under 35 U.S.C. 154(b), the term of this patent shall be extended for 0 days.

(21) Appl. No.: 09/100,688

(22) Filed: Jun. 19, 1998

(51) Int. Cl.⁷ ..................................................... B32B 23/08
(52) U.S. Cl. ........................... 428/138; 428/131; 428/137; 428/212; 428/213; 428/214; 428/334; 428/423.1; 428/425.1; 428/480; 428/481; 428/507; 428/511; 428/514; 428/537.5
(58) Field of Search ........................... 52/169.11, 169.14, 52/746.1, 741.3; 428/138, 131, 342, 137, 423.1, 425.1, 537.5, 507, 511, 514, 480, 212, 213, 214, 334, 481

(56) References Cited

U.S. PATENT DOCUMENTS

| | | | |
|---|---|---|---|
| 3,391,056 | * | 7/1968 | Robinson ............................. 161/232 |
| 3,551,270 | * | 12/1970 | Sharkey ................................. 156/87 |
| 4,078,348 | * | 3/1978 | Rothman .............................. 52/309.4 |
| 4,126,725 | * | 11/1978 | Shiflet ................................... 428/110 |
| 4,467,728 | * | 8/1984 | Horne .................................. 108/51.1 |
| 4,564,554 | * | 1/1986 | Mikusi .............................. 428/311.9 |
| 4,606,959 | * | 8/1986 | Hillinger ............................. 428/116 |
| 4,866,897 | * | 9/1989 | Yount ................................... 52/363 |
| 5,220,760 | * | 6/1993 | Dimakis .............................. 52/309.9 |
| 5,700,570 | * | 12/1997 | Fahmy ................................. 428/342 |
| 5,712,038 | * | 1/1998 | Yamazaki et al. ................. 428/411.1 |
| 6,048,605 | * | 4/2000 | Doyle ................................... 428/214 |

* cited by examiner

Primary Examiner—Ellis Robinson
Assistant Examiner—Alicia Chevalier
(74) Attorney, Agent, or Firm—Donald R. Fraser

(57) ABSTRACT

A composite sheathing material comprises a first layer of paperboard having a layer of a permeable resin on a surface thereof, a core layer of paperboard, a first adhesive layer positioned intermediate and adhered to the first layer of paperboard and the core layer of paperboard, said first adhesive layer including a plurality of apertures therethrough, a second layer of paperboard having a second layer of a permeable resin on a surface thereof, and a second adhesive layer positioned intermediate and adhered to the second layer of paperboard and the core layer of paperboard, said second adhesive layer including a plurality of apertures therethrough.

18 Claims, 1 Drawing Sheet

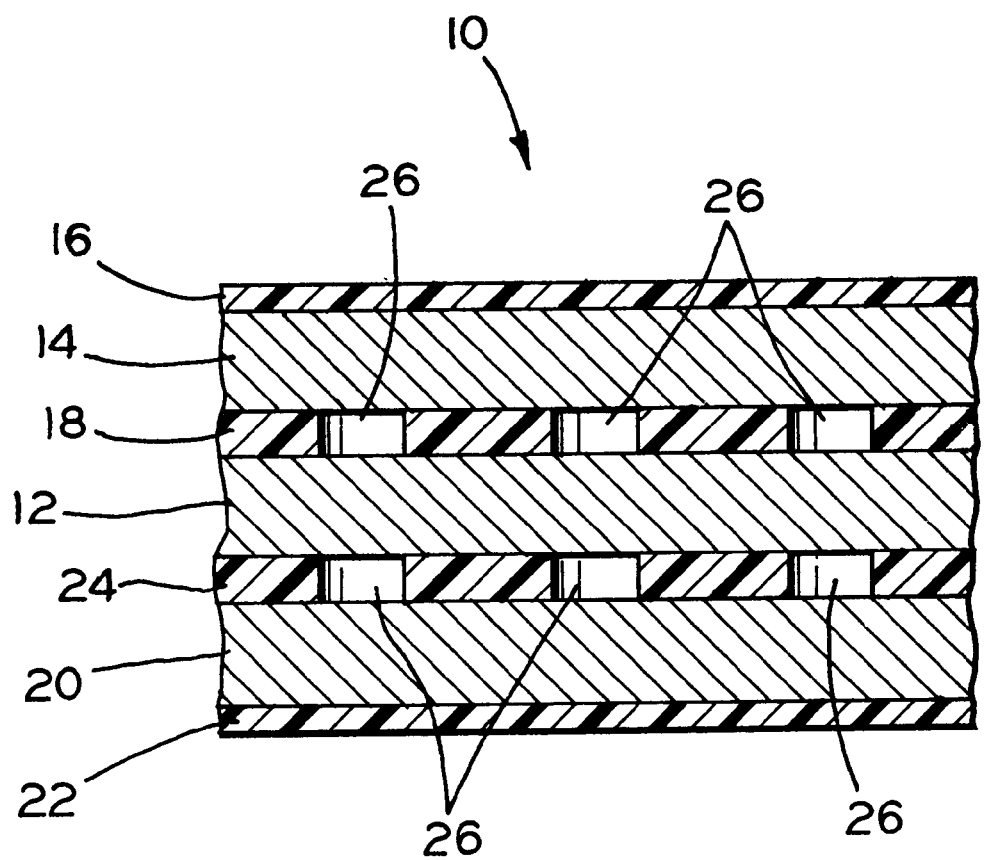

COMPOSITE SHEATHING MATERIAL HAVING HIGH WATER VAPOR PERMEABILITY

FIELD OF THE INVENTION

This invention relates generally to a composite sheathing material having a high water vapor permeability. More particularly, the invention is directed to a multi-layered, laminated composite sheathing material which effectively precludes the passage therethrough of liquid water while permitting a high rate of water vapor permeation. The inventive composite sheathing material is useful as an exterior wall component for constructing residential and commercial buildings.

BACKGROUND OF THE INVENTION

Composite sheathing materials are widely used in the building and construction industries as wall components or panels for sheathing the walls which form the exterior surfaces of a building. Such sheathing materials may be exposed to liquid water from rain or melting snow from outside the building, and water vapor from inside the building. Preferred sheathing materials would prevent the passage of liquid water from the exterior to the interior of the building, while allowing the passage of water vapor through the sheathing material from the interior to the exterior of the building. Conventional composite sheathing materials, while preventing the passage of liquid water therethrough, only provide water vapor permeability values of up to about 1.5 perms.

It would be desirable to prepare a composite sheathing material that would substantially prevent the passage therethrough of liquid water while allowing a high rate of water vapor permeation.

SUMMARY OF THE INVENTION

Accordant with the present invention, there has surprisingly been discovered a composite sheathing material that is substantially impervious to liquid water but is highly permeable to water vapor. The composite sheathing material comprises:

a first layer of paperboard, having a first layer of a permeable resin on a surface thereof;

a core layer of paperboard;

a first adhesive layer positioned intermediate and adhered to the first layer of paperboard and the core layer of paperboard, the first adhesive layer including a plurality of apertures therethrough;

a second layer of paperboard, having a second layer of permeable resin on a surface thereof; and a second adhesive layer positioned intermediate and adhered to the second layer of paperboard and the core layer of paperboard, the second adhesive layer including a plurality of apertures therethrough.

The inventive composite sheathing material according to the present invention is particularly useful as a wall component for the exterior walls of a residential or commercial building.

BRIEF DESCRIPTION OF THE DRAWING

The novel features that are considered characteristic of the invention are set forth with particularity in the appended claims. The invention itself, however, will best be understood from the accompanying description of a specific embodiment, when considered in conjunction with the attendant drawing in which the FIGURE is a schematic representation of an embodiment of the composite sheathing material according to the present invention.

DETAILED DESCRIPTION OF THE PREFERRED EMBODIMENT

Referring now to the FIGURE, there is shown generally at 10 a schematic representation of a composite sheathing material according to the present invention. The composite sheathing material 10 comprises a core layer of paperboard 12, a first layer of paperboard 14 having a first layer of a permeable resin 16 on a surface thereof, said first layer of paperboard 14 being adhered to the core layer of paperboard 12 by means of a first adhesive layer 18 therebetween, and a second layer of paperboard 20 having a second layer of a permeable resin 22 on a surface thereof, said second layer of paperboard 20 being adhered to the core layer of paperboard 12 by means of a second adhesive layer 24 therebetween.

The first, second, and core layers of paperboard 14, 20, and 12, respectively, are well known materials conventionally used to manufacture laminated materials. By the term "paperboard" as it is used herein is meant all forms of paper and paperboard-like materials known as useful for manufacturing composite structures. Particularly useful paperboard materials include kraft paper and kraft liner board, which materials are made primarily from pine wood by digestion with a mixture of caustic soda, sodium sulfate, sodium carbonate, and sodium sulfide. These materials may additionally contain conventional paper adjutants such as, for example, strength increasing agents, sizing agents such as, for example, paste rosin, liquid rosin, dispersed rosin, alkyl ketene dimer, alkenyl succinic anhydride, styrene maleic anhydride, wax emulsions, and latex polymer emulsions, preservatives, fillers, clays, kaolin, talc, barium sulfate, calcium carbonate, and the like. The paperboard may vary in thickness over wide limits from about 0.003 inch to about 0.2 inch. A preferred kraft paperboard having a thickness of about 0.037 inch may be obtained from Tenneco Packaging.

The first and second layers of permeable resin may be applied to the first and second layers of paperboard 14 and 20, respectively, by any conventional coating technique such as, for example, by extrusion coating. These layers of permeable resin form monolithic coverings for the exposed major surfaces of the paperboard layers, and are substantially impervious to liquid water but have a molecular structure which allows the passage of water vapor therethrough. By the term "permeable resin layer" as it is used herein is meant that the resin layer is substantially impervious to liquid water, but is highly permeable to water vapor. The permeable resin layers 16 and 22 may comprise conventionally known "breathable" (permeable) resins made from polyesters, polyurethanes, acrylic polymers, polyethers, ester-ether copolymers, and the like, as well as blends and copolymers thereof. The thicknesses of the individual permeable resin layers may vary over wide limits from about 0.0002 inch to about 0.005 inch. Preferably, the thickness of each layer is about 0.001 inch. A particularly preferred permeable resin comprises "EASTMAN 73-3" resin, available from the Eastman Chemical Company. The first and second permeable resin layers may be the same or may be different.

The first and second adhesive layers 18 and 24 may be prepared from polymers including, for example, polyvinyl alcohols, acrylics, thermoplastic hot melts, urea or melamine formaldehyde resins, phenolics, and the like, as well as blends and copolymers thereof. A preferred adhesive is polyvinyl alcohol. The individual thicknesses of the first and second adhesive layers may vary over wide limits from about 0.001 inch to about 0.01 inch, and the first and second adhesive layers may be the same or different.

A critical aspect of the present invention is the fact that the first and second adhesive layers, when assembled into the finished composite sheathing material, contain a plurality of apertures 26 therethrough. This is the primary structural feature that contributes to the high permeability of the finished composite sheathing material. Thus, while liquid water is prevented from passing through the composite sheathing material due to the presence of the resin layers 16 and 22, water vapor nevertheless is able to pass through the permeable resin layers 16 and 22 and through the apertures 26 of the first and second adhesive layers 18 and 24. The apertures are formed during the composite manufacturing and assembly process, as explained hereinafter.

The various components of the composite sheathing material are assembled and laminated together by conventional means. In a preferred process, the first and second adhesive layers are applied to the appropriate surfaces of the first and second paperboard layers, respectively, which paperboard layers are then contacted and adhered to the core paperboard layer using conventional, continuous lamination techniques. The adhesive layers are applied or "printed onto" the paperboard layers using an engraved transfer roll. Accordingly, only the high points of the engraved roll contact the paperboard layers, thereby transferring the adhesive only to those areas of surface contact. Thus, adhesive is applied to the paperboard layers in a selected pattern, which pattern includes a plurality of voids where no adhesive at all is applied to the surfaces of the paperboard layers. As will be obvious to one ordinarily skilled in the art, the pattern and resulting amount of void space from which the apertures are formed may vary considerably, and can easily be chosen by balancing the water vapor permeability requirements with the need for structural integrity in the finished composite sheathing material. A preferred engraved roll pattern comprises grooves at a concentration of about 30 lines per inch in the machine direction and about one line per inch in the cross-machine direction. Thus, the widths of the apertures void of adhesive would be far smaller than the random lengths of the wood pulp fibers in the paperboard layers, so that all surface wood pulp fibers would be at least partially contacted by the adhesive thereby assuring a 100% fiber pull.

Preferably, the composite sheathing material is manufactured using a continuous lamination process utilizing uninterrupted running webs of paperboard, and permeable resin and adhesive application methods as described hereinabove. Thereafter, the composite sheathing material may be cut to appropriately sized panels for use as exterior building wall components.

Composite sheathing materials manufactured by the processes described herein, utilizing the preferred materials and parameters, have demonstracted a water vapor permeability of 5 perms and a 12% water absorption after immersion in water for 24 hours.

From the foregoing description, one ordinarily skilled in the art can easily ascertain the essential characteristics of this invention and, without departing from its spirit or scope, can make various changes and modifications to adapt the invention to various uses and conditions.

What is claimed is:

1. A composite sheathing material, comprising:
   a first layer of paperboard, having a first layer of a permeable resin on a surface thereof;
   a core layer of paperboard;
   a first adhesive layer positioned intermediate and adhered to the first layer of paperboard and the core layer of paperboard, said first adhesive layer including a plurality of apertures therethrough;
   a second layer of paperboard, having a second layer of permeable resin on a surface thereof; and
   a second adhesive layer positioned intermediate and adhered to the second layer of paperboard and the core layer of paperboard, said second adhesive layer including a plurality of apertures therethrough.

2. The composite sheathing material according to claim 1, wherein the layers of paperboard comprise kraft paper.

3. The composite sheathing material according to claim 1, wherein the layers of paperboard have thicknesses ranging from about 0.003 inch to about 0.2 inch.

4. The composite sheathing material according to claim 1, wherein the layers of paperboard have thicknesses of about 0.037 inch.

5. The composite sheathing material according to claim 1, wherein the layers of permeable resin comprise polyesters, polyurethanes, acrylic polymers, polyethers, ester-ether copolymers, or blends or copolymers thereof.

6. The composite sheathing material according to claim 1, wherein the layers of permeable resin have thicknesses ranging from about 0.0002 inch to about 0.005 inch.

7. The composite sheathing material according to claim 1, wherein the layers of permeable resin have thicknesses of about 0.001 inch.

8. The composite sheathing material according to claim 1, wherein the layers of permeable resin are different.

9. The composite sheathing material according to claim 1, wherein the adhesive layers comprise a polyvinyl alcohol, acrylic, thermoplastic hot melt, urea or melamine formaldehyde resin, phenolic, or a blend or copolymer thereof.

10. The composite sheathing material according to claim 1, wherein the adhesive layers comprise a polyvinyl alcohol.

11. The composite sheathing material according to claim 1, wherein the adhesive layers have thicknesses ranging from about 0.001 inch to about 0.01 inch.

12. The composite sheathing material according to claim 1, wherein the adhesive layers are different.

13. A composite sheathing material, comprising:
    a first layer of kraft paperboard, having a first layer of a permeable resin on the surface thereof, said first layer of kraft paperboard having a thickness ranging from about 0.003 inch to about 0.2 inch, said first layer of permeable resin comprising a polyester, polyurethane, acrylic polymer, polyether, ester-ether copolymer, or a blend or copolymer thereof, said first layer of permeable resin having a thickness ranging from about 0.0002 inch to about 0.005 inch;
    a core layer of kraft paperboard, having a thickness ranging from about 0.003 inch to about 0.2 inch;
    a first adhesive layer positioned intermediate and adhered to the first layer of paperboard and the core layer of paperboard, said first adhesive layer comprising a polyvinyl alcohol, acrylic, thermoplastic hot melt, urea or melamine formaldehyde resin, phenolic, or a blend or copolymer thereof, said first adhesive layer having a thickness ranging from about 0.001 inch to about 0.01 inch, said first adhesive layer including a plurality of apertures therethrough;

a second layer of kraft paperboard, having a second layer of a permeable resin on a surface thereof, said second layer of kraft paperboard having a thickness ranging from about 0.003 inch to about 0.2 inch, said second layer of permeable resin comprising a polyester, polyurethane, acrylic polymer, polyether, ester-ether copolymer, or a blend or copolymer thereof, said second layer of permeable resin having a thickness ranging from about 0.0002 inch to about 0.005 inch; and a second adhesive layer positioned intermediate and adhered to the second layer of kraft paperboard and the core layer of kraft paperboard, said second adhesive layer comprising a polyvinyl alcohol, acrylic, thermoplastic hot melt, urea or melamine formaldehyde resin, phenolic, or a blend or copolymer thereof, said second adhesive layer having a thickness ranging from about 0.001 inch to about 0.01 inch, said second adhesive layer including a plurality of apertures therethrough.

14. The composite sheathing material according to claim 13, wherein the layers of kraft paperboard have thicknesses of about 0.037 inch.

15. The composite sheathing material according to claim 13, wherein the layers of permeable resin have thicknesses of about 0.001 inch.

16. The composite sheathing material according to claim 13, wherein the adhesive layers comprise a polyvinyl alcohol.

17. The composite sheathing material according to claim 13, wherein the adhesive layers are the same.

18. The composite sheathing material according to claim 13, wherein the adhesive layers are different.

* * * * *